United States Patent
Harada et al.

(10) Patent No.: US 9,868,584 B2
(45) Date of Patent: Jan. 16, 2018

(54) CHEMICAL STORAGE CONTAINER AND METHOD FOR REPLACING ITS INTERNAL ATMOSPHERE WITH DRY AIR

(71) Applicant: DAI NIPPON PRINTING CO., LTD., Tokyo-to (JP)

(72) Inventors: Ryo Harada, Tokyo-to (JP); Noriko Kumazawa, Tokyo-to (JP); Hiroaki Gotou, Tokyo-to (JP); Masato Miyake, Tokyo-to (JP); Katsuyuki Motai, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 71 days.

(21) Appl. No.: 14/909,558

(22) PCT Filed: Oct. 23, 2014

(86) PCT No.: PCT/JP2014/078273
§ 371 (c)(1),
(2) Date: Feb. 2, 2016

(87) PCT Pub. No.: WO2015/060411
PCT Pub. Date: Apr. 30, 2015

(65) Prior Publication Data
US 2016/0176615 A1 Jun. 23, 2016

(30) Foreign Application Priority Data

Oct. 24, 2013 (JP) ................................. 2013-220994

(51) Int. Cl.
B65D 83/00 (2006.01)
B65D 77/06 (2006.01)
(Continued)

(52) U.S. Cl.
CPC ......... *B65D 83/0055* (2013.01); *B65D 77/06* (2013.01); *B65D 83/28* (2013.01);
(Continued)

(58) Field of Classification Search
CPC ........ B65D 25/14; B65D 33/36; B65D 47/34; B65D 77/06; B65D 83/14; B65D 83/42;
(Continued)

(56) References Cited

U.S. PATENT DOCUMENTS 6,375,046 B1 * 4/2002 Alleard ................ B65D 83/425
141/20
9,051,167 B2 * 6/2015 Burge .................. B67D 1/0462
(Continued)

FOREIGN PATENT DOCUMENTS

CN 102252511 A 11/2011
CN 102424217 A 4/2012
(Continued)

OTHER PUBLICATIONS

Jan. 26, 2017 Office Action issued in Chinese Patent Application No. 201480019147.3.

*Primary Examiner* — Timothy L Maust
(74) *Attorney, Agent, or Firm* — Oliff PLC

(57) ABSTRACT

There is provided a chemical storage container which is capable of replacing the internal atmosphere with dry air. The chemical storage container includes a metal can having a top opening, a chemical storage bag disposed in the metal can, and an ejection member mounted to the chemical storage bag. Dry air is supplied through a dry air supply opening into the chemical storage bag, and the dry air in the chemical storage bag is discharged to the outside via a chemical nozzle.

12 Claims, 5 Drawing Sheets

(51) Int. Cl.
  *B65D 83/28* (2006.01)
  *B65D 83/40* (2006.01)
  *B65D 83/62* (2006.01)
  *H01M 10/0525* (2010.01)
  *H01M 10/0566* (2010.01)

(52) U.S. Cl.
  CPC ............ *B65D 83/40* (2013.01); *B65D 83/62* (2013.01); *H01M 10/0525* (2013.01); *H01M 10/0566* (2013.01)

(58) Field of Classification Search
  CPC .... B65D 83/0055; B67D 1/04; B67D 1/0462; B67D 1/0831; B67D 1/125
  USPC ....................................................... 141/3, 20
  See application file for complete search history.

(56) References Cited

U.S. PATENT DOCUMENTS

| | | | |
|---|---|---|---|
| 2014/0117043 A1* | 5/2014 | Ware ...................... | B65D 85/84 222/95 |
| 2016/0009472 A1* | 1/2016 | Motai .................... | B65D 77/06 220/495.05 |
| 2016/0176615 A1* | 6/2016 | Harada .............. | B65D 83/0055 222/95 |

FOREIGN PATENT DOCUMENTS

| | | |
|---|---|---|
| JP | H10-436 A | 1/1998 |
| WO | 08/101275 A1 | 8/2008 |
| WO | WO 2008101275 A1 * | 8/2008 ......... B65D 83/0055 |

\* cited by examiner

CHEMICAL STORAGE CONTAINER AND METHOD FOR REPLACING ITS INTERNAL ATMOSPHERE WITH DRY AIR

BACKGROUND

1. Technical Field

The disclosure relates to a chemical storage container for storing a liquid chemical, such as a lithium-ion battery electrolyte, and relates to a method for replacing the internal atmosphere of the chemical storage container with dry air.

2. Description of the Related Art

A liquid chemical such as a lithium-ion battery electrolyte is generally stored and transported in a canister (metal can). The liquid chemical is taken from the metal can and used as necessary.

The interior of the metal can, from which the liquid chemical has been taken, is cleaned. A new liquid chemical is put into the cleaned metal can, and the metal can is transported.

A lithium-ion battery electrolyte needs to be handled carefully: For example, cleaning of a metal can, which has once stored a lithium-ion battery electrolyte, needs to be performed with high accuracy. This requires a high cost for the cleaning of the metal can.

For cleaning of a canister, it is necessary to plan a cleaning process so that in addition to the removal of the contents, no residues will remain in the canister after cleaning (patent document 1).

RELATED ART DOCUMENT

Patent Document

Patent document 1: Japanese Patent Laid-Open Publication No. H10-000436

As described above, when a liquid chemical such as a lithium-ion battery electrolyte is stored in a metal can, the interior of the metal can needs to be cleansed every time the liquid chemical is taken out. Thus, a high cost is required for the cleaning. Further, it is necessary to perform drying of the cleaned metal can at about 60° C. for a long time, such as about 12 hours in order to completely remove moisture from the interior of the metal can.

A chemical storage container has been developed which includes a metal can, a chemical storage bag disposed in the metal can, and a chemical nozzle which penetrates through the metal can and the chemical storage bag. A liquid chemical is discharged from the chemical storage bag via the chemical nozzle. In particular, pressurized $N_2$ gas is supplied from an $N_2$ gas supply nozzle to a space between the metal can and the chemical storage bag so that the liquid chemical in the chemical storage bag is discharged to the outside by the pressurized gas. The chemical nozzle and the $N_2$ gas supply nozzle are held by an ejection member provided in the metal can and the chemical storage bag.

When a liquid chemical like a lithium-ion battery electrolyte is stored in the chemical storage bag of the above-described chemical storage container, it is necessary to decrease the dew point in the chemical storage bag e.g. to about −50° C. to −70° C. because a lithium-ion battery electrolyte is sensitive to humidity. However, control of the dew point in such a chemical storage bag has not yet been practiced.

There is also a demand to perform control of the dew point in such a chemical storage bag in a short time.

The present invention has been made in view of the above situation. It is therefore an object of the present invention to provide a chemical storage container and a method for replacing the internal atmosphere of the chemical storage container with dry air, which can securely control the dew point in a chemical storage bag and decrease the dew point e.g. to about −50° C. to −70° C. and, in addition, can effect control of the dew point in a short time without performing a long drying process.

SUMMARY

Some embodiments provide a chemical storage container comprising: an outer container having a top opening; and a chemical storage bag for storing a liquid chemical, disposed in the outer container and having an ejection member provided at the upper end of the chemical storage bag, wherein the ejection member is disposed in the top opening of the outer container, wherein a lid which closes the top opening of the outer container is provided such that it covers the ejection member, wherein the lid is provided with a chemical nozzle for discharging the liquid chemical and which extends through the interior of the ejection member, and a pressurized gas supply nozzle for supplying a pressurized gas into the interior of the ejection member, wherein the interior of the ejection member is divided into a chemical nozzle space through which the chemical nozzle extends and which communicates with the interior of the chemical storage bag, and a pressurized gas space which is to be filled with the pressurized gas, wherein the ejection member has a through-hole which connects the pressurized gas space to a pressurization space formed between the outer container and the chemical storage bag, and wherein the lid has a dry air supply opening for supplying dry air into the chemical nozzle space.

Some embodiments provide a method for replacing the internal atmosphere of a chemical storage container with dry air, comprising the steps of: preparing a chemical storage container comprising: an outer container having a top opening; and a chemical storage bag for storing a liquid chemical, disposed in the outer container and having an ejection member provided at the upper end of the chemical storage bag, wherein the ejection member is disposed in the top opening of the outer container, wherein a lid which closes the top opening of the outer container is provided such that it covers the ejection member, wherein the lid is provided with a chemical nozzle for discharging the liquid chemical and which extends through the interior of the ejection member, and a pressurized gas supply nozzle for supplying a pressurized gas into the interior of the ejection member, wherein the interior of the ejection member is divided into a chemical nozzle space through which the chemical nozzle extends and which communicates with the interior of the chemical storage bag, and a pressurized gas space which is to be filled with the pressurized gas, wherein the ejection member has a through-hole which connects the pressurized gas space to a pressurization space formed between the outer container and the chemical storage bag, and wherein the lid has a dry air supply opening for supplying dry air into the chemical nozzle space; supplying dry air into the chemical storage bag from the dry air supply opening of the chemical storage container; and discharging the dry air in the chemical storage bag to the outside via the chemical nozzle.

DESCRIPTION OF THE PREFERRED EMBODIMENTS

Preferred embodiments will now be described with reference to the drawings. The embodiments include a chemical storage container, and a method for replacing the internal atmosphere of a chemical container with dry air. Exemplary embodiments of the present invention are described herein. It should be noted that these exemplary embodiments are merely examples and the present invention is not limited to the detailed embodiments.

FIGS. 1 through 5A, 5B are diagrams showing an embodiment of a chemical storage container according to some embodiments.

Figure 1:
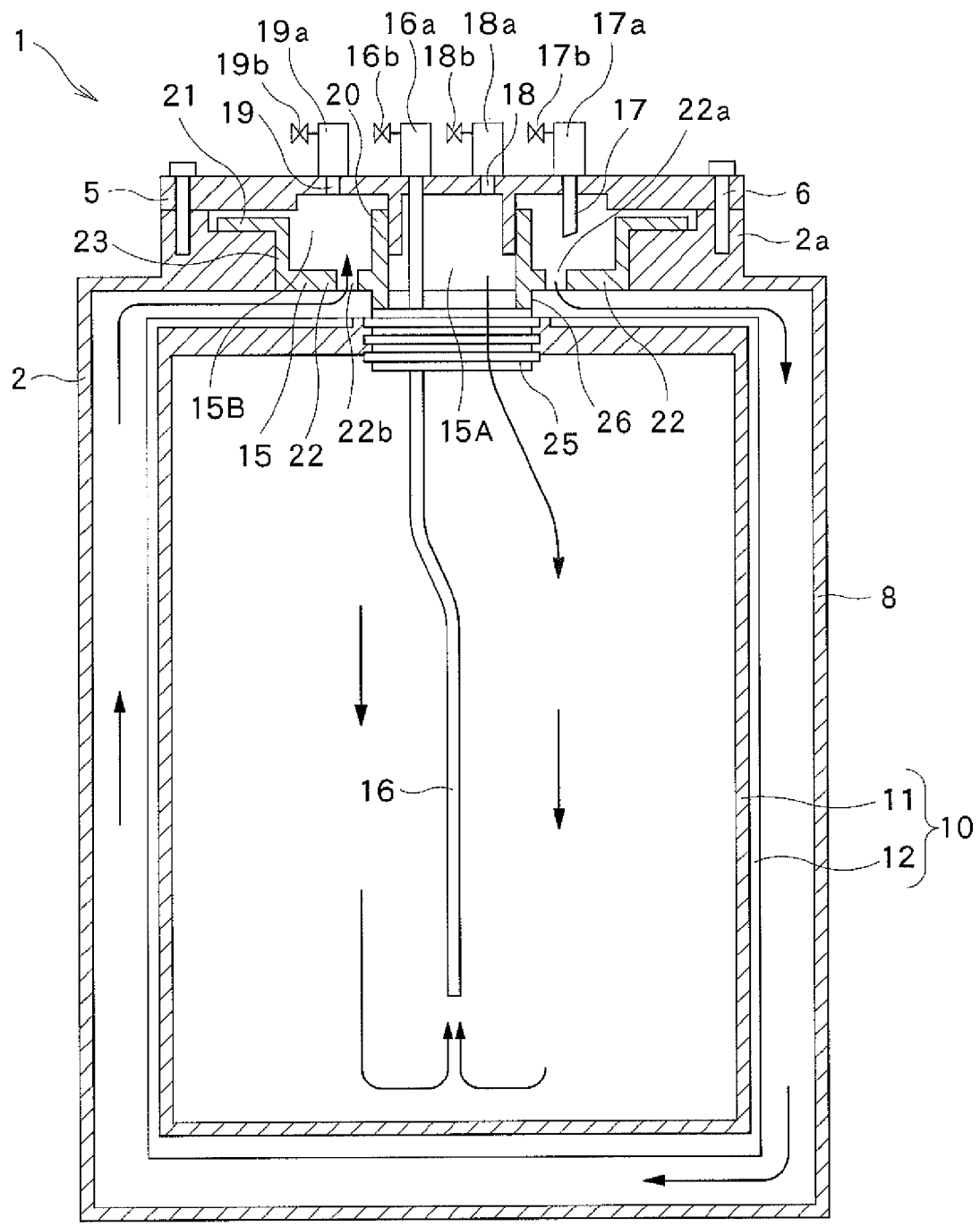
FIG. 1 is an overall schematic view of a chemical storage container according to an embodiment.
Figure 2:
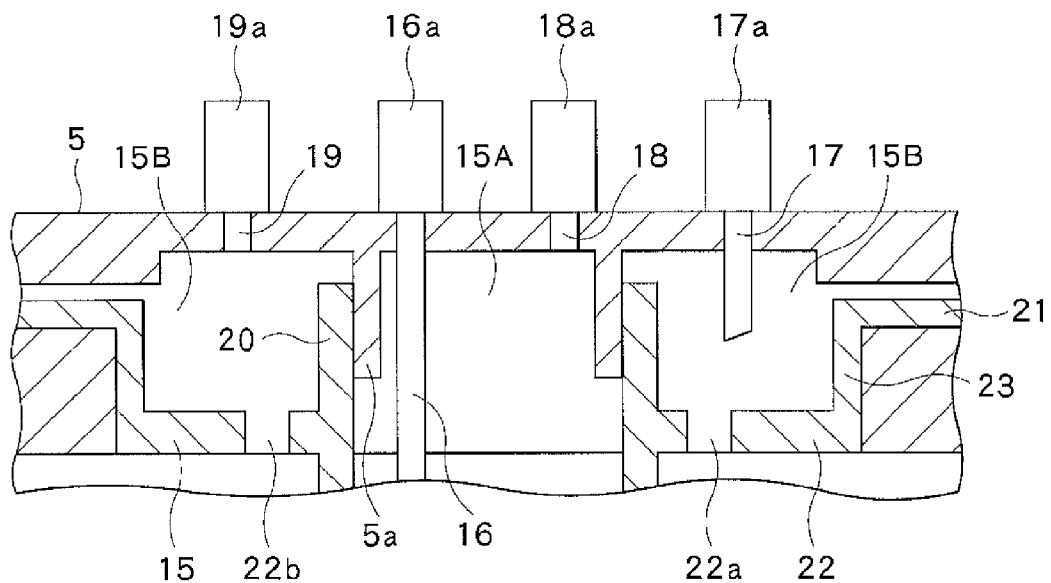
FIG. 2 is an enlarged side view of an ejection member.
Figure 3:
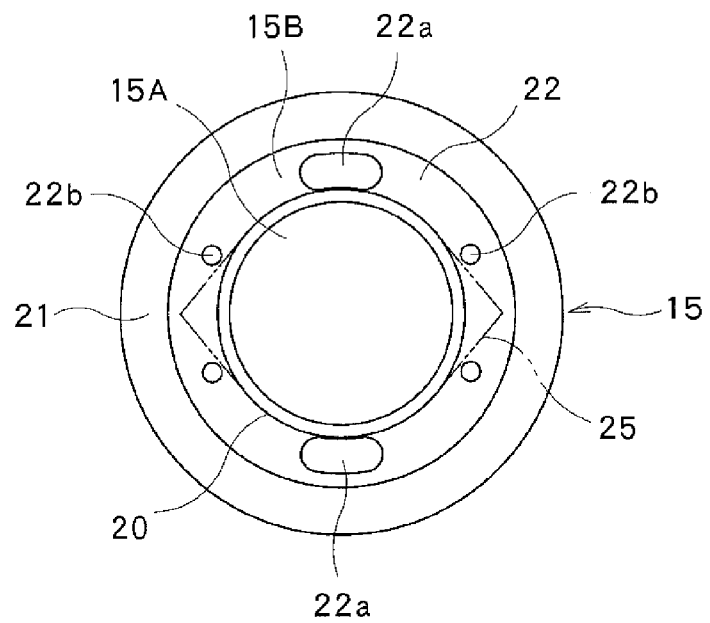
FIG. 3 is a plan view of the ejection member of the chemical storage container.

First, the chemical storage container will be outlined with reference to FIGS. 1 through 3.

As shown in FIGS. 1 through 3, the chemical storage container 1 includes a chemical storage bag 10 for storing a liquid chemical such as a lithium-ion battery electrolyte, and an outer container 2 made of a metal (hereinafter also referred to as the metal can). Besides a metal, the outer container 2 may be made of a synthetic resin.

Besides a lithium-ion battery electrolyte, the chemical storage bag 10 can store other liquid chemicals, for example, a liquid chemical for resist removal, a liquid chemical for etching or other liquid chemicals for use in a semiconductor manufacturing process.

Further, the chemical storage bag 10 may store: a liquid chemical for resist removal or an etching liquid for use in a lead frame manufacturing process; a liquid chemical for resist removal or an etching liquid for use in a suspension substrate manufacturing process; or a printing ink for use in a printing process.

A Li ion-containing organic electrolyte, e.g. containing $LiClO_4$ or $LiPF_6$, can be used as a lithium-ion battery electrolyte to be stored in the chemical storage bag 10.

Such an organic electrolyte does not match moisture, halogens, metal ions, etc. Therefore, a material containing little moisture, halogens, metal ions, etc. is preferably used for an inner bag 11 which stores such an organic electrolyte.

The metal can 2 has a top opening 2a which is closed by a lid 5. The metal can 2 and the lid 5 are made of stainless steel.

Figure 4:
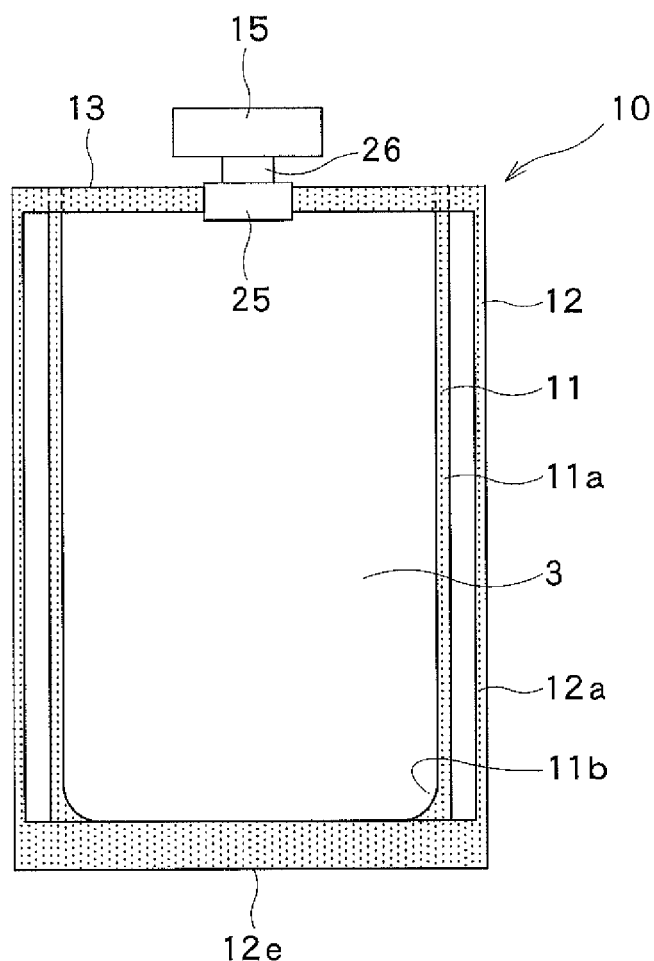
FIG. 4 is a schematic side view of a chemical storage bag.

As shown in FIG. 4, the chemical storage bag 10 includes the inner bag 11 for storing a liquid chemical 3 such as a lithium-ion battery electrolyte, and an outer bag 12 that surrounds the inner bag 11. An ejection member 15 penetrates through the inner bag 11 and the outer bag 12.

The installation structure of the ejection member 15 and the lid 5 will now be described with reference to FIGS. 1 through 3.

As shown in FIGS. 1 through 3, the ejection member 15 is fit into the top opening 2a of the metal can 2, while the lid 5 covers the ejection member 15 and closes the top opening 2a of the metal can 2, and is fixed by bolts (fixing means) 6 to a portion of the metal can 2, located around the top opening 2a.

In particular, the lid 5 is fixed to a portion of the metal can 2, located around the top opening 2a, by tightening the bolts 6 with a torque wrench. By tightening the bolts 6 with a torque wrench, the bolts 6 can be tightened with a desired tightening force. The contact surface between the lid 5 and the portion of the metal can 2 located around the top opening 2a is horizontal, and is orthogonal to the tightening direction of the bolts 6. Therefore, the tightening force of the bolts 6 can be directly transmitted to the contact surface, whereby the lid 5 can be securely fixed to the portion of the metal can 2 located around the top opening 2a.

If the inner peripheral surface of the lid 5 and the outer peripheral surface of the portion of the metal can 2 located around the top opening 2a are threaded, and the lid 5 is screw-fixed by screwing the inner peripheral surface of the lid 5 into the outer peripheral surface of the portion of the metal can 2 located around the top opening 2a, then the contact surface between the lid 5 and the portion of the metal can 2 located around the top opening 2a is vertical, and is parallel to the screwing direction. Therefore, the screwing force can hardly be transmitted directly to the contact surface.

According to this embodiment, on the other hand, the tightening direction of the bolts 6 is orthogonal to the contact surface between the lid 5 and the metal can 2, and therefore can be directly transmitted to the contact surface.

Accordingly, the space between the lid 5 and the portion of the metal can 2 located around the top opening 2a can be kept highly hermetic. This makes it possible to easily and securely control a dew point in the range of −50° C. to −70° C. in the chemical storage bag 10 and in a pressurization space 8 as will be described later.

The ejection member 15 will now be described further. The ejection member 15 has a bottom 22, a side 23 at the periphery of the bottom 22, and a peripheral flange 21 provided at the upper end of the side 23. The ejection member 15 is positioned with respect to the top opening 2a of the metal can 2 by fitting the side 23 into the inner surface of the top opening 2a.

The ejection member 15 is provided with a cylindrical partition wall 20 which divides the interior of the ejection member 15 into a chemical nozzle space 15A through which the below-described chemical nozzle 16 extends, and a pressurized gas space 15B which is to be filled with a pressurized gas supplied from the below-described pressurized gas supply nozzle 17. Thus, the chemical nozzle space 15A, through which the chemical nozzle 16 extends, is formed inside the cylindrical partition wall 20 of the ejection member 15, while the pressurized gas space 15B is formed outside the cylindrical partition wall 20 of the ejection member 15.

In this embodiment a partition wall 5a, which is in contact with the inner surface of the partition wall 20 of the ejection member 15, is provided on the lower surface of the lid 5. The partition wall 20 of the ejection member 15 and the partition wall 5a of the lid 5 hermetically divide the interior of the ejection member 15 into the chemical nozzle space 15A and the pressurized gas space 15B.

However, the interior of the ejection member 15 may be divided into the chemical nozzle space 15A and the pressurized gas space 15B by only one of the partition wall 20 and the partition wall 5a, for example, by only the partition wall 20 of the ejection member 15.

The ejection member 15 has the bottom 22, as described above, and a plurality of through-holes 22a and through-holes 22b are formed in the bottom 22. The pressurized gas space 15B of the ejection member 15 communicates via the through-holes 22a, 22b with a pressurization space 8 formed between the metal can 2 and the chemical storage bag 10.

The ejection member 15 has a coupling portion 26 which extends downward from the partition wall 20. The coupling portion 26, at its lower end, has a seal fixing portion 25 to which is fixed a sealed portion 13 where the inner bag 11 and the outer bag 12 are sealed integrally. The seal fixing portion 25 of the ejection member 15 has a generally elliptical shape in a plan view so that the sealed portion 13 of the chemical storage bag 10 can be easily fixed to the seal fixing portion 25.

As described above, the chemical nozzle 16 penetrates through the chemical nozzle space 15A of the ejection member 15, and a pressurized gas is supplied from the pressurized gas supply nozzle 17 into the pressurized gas space 15B.

As shown in FIGS. 1 through 3, the chemical nozzle 16 extends in the chemical nozzle space 15A of the ejection member 15, and is firmly held by the lid 5. The chemical nozzle 16 is provided to eject the liquid chemical 3 from a chemical storage bag 10. However, the chemical nozzle 16 may also be used to fill the liquid chemical 3 into the chemical storage bag 10.

The pressurized gas supply nozzle 17 is also firmly held by the lid 5, and can fill an inert gas, such as $N_2$ gas, into the pressurized gas space 15B of the ejection member 15. The inert gas which has been supplied from the pressurized gas supply nozzle 17 into the pressurized gas space 15B is fed through the through-holes 22a, 22b into the pressurization space 8 between the metal can 2 and the chemical storage bag 10. The chemical storage bag 10 can be pressurized from the outside by the inert gas supplied into the pressurization space 8, whereby the liquid chemical 3 in the chemical storage bag 10 can be discharged from the chemical nozzle 16.

A connecter (chemical nozzle connecter) 16a equipped with an on-off valve 16b is provided at the upper end of the chemical nozzle 16 mounted to the lid 5. A connecter (pressurized gas supply nozzle connecter) 17a equipped with an on-off valve 17b is provided at the upper end of the pressurized gas supply nozzle 17. The chemical nozzle connecter 16a and the pressurized gas supply nozzle connecter 17a, at their ends not coupled to the chemical nozzle 16 or the pressurized gas supply nozzle 17, are each coupled to a desired external device, for example, a chemical discharge device or a pressurized gas source.

The above-described ejection member 15 as a whole is made of synthetic resin.

Figure 5A:
FIG. 5A is a cross-sectional view of a material for an inner bag.

The chemical storage bag 10 will now be described with reference to FIGS. 4 and 5. The inner bag 11, constituting the chemical storage bag 10, is obtained by preparing a pair of films composed of an inner bag material 11A, and heat-sealing the peripheries of the pair of films to form a heat-sealed portion 11a (see FIG. 5A).

A polyolefin material, such as PE (Polyethylene) or PP (Polypropylene), can be used as the inner bag material 11A. The inner bag 11 is to directly contact the liquid chemical 3. Therefore, a material containing little moisture, halogens and metal ions which a lithium-ion battery electrolyte does not match, for example, a material having a low moisture content, a low halogen content and a low metal ion content, is preferably used as the inner bag material 11A. Further, an additive-free polyolefin material is preferably used as the inner bag material 11A. The use of an additive-free polyolefin material can prevent a component of the inner bag material 11A from dissolving in the liquid chemical 3.

The corner 11b of the inner bag 11 has a curved surface so that the inner bag 11 will not break even when pressure is applied from the liquid chemical 3 to the inner surface of the inner bag 11 during transport of the chemical storage container 1 holding the liquid chemical 3.

In particular, in the chemical storage container 1, the chemical storage bag 10, having the inner bag 11 in which the liquid chemical 3 is held, is disposed in the metal can 2. It is possible that during transport of the chemical storage container 1, pressure may be applied to the inner surface of the inner bag 11 from the liquid chemical 3 in the inner bag 11.

If the corner 11b of the inner surface of the inner bag 11 has a polygonal shape, a local stress will be generated in the polygonal corner 11b when pressure is applied from the liquid chemical 3 to the inner surface of the inner bag 11, which can result in breakage of the inner bag 11 in the vicinity of the corner 11b.

According to an embodiment, on the other hand, the corner 11b of the inner surface of the inner bag 11 has a curved shape. Therefore, even when pressure is applied from the liquid chemical 3 to the inner surface of the inner bag 11 during transport of the chemical storage container 1, no local stress will be generated in the curved corner 11b. This can prevent breakage of the inner bag 11 in the vicinity of the corner 11b.

The corner 11b of the inner bag 11 having a curved surface can be obtained by shaping the heat-sealed portion 11a such that the corner 11b has a curved surface.

The outer bag 12 will now be described further. The outer bag 12 surrounds the inner bag 11, is disposed in the metal can 2, and functions to externally protect the inner bag 11 so that an impact on the metal can 2 will not be directly transmitted to the inner bag 11.

Figure 5B:
FIG. 5B is a cross-sectional view of a material for an outer bag.

Therefore, a laminate including an inner polyolefin layer, such as PE or PP, and an outer PET (Polyethylene Telephthalate) or Ny (Nylon) layer may be used as an outer bag material 12A for the outer bag 12 (see FIG. 5B).

The polyolefin layer such as PE or PP functions as a heat-seal layer, and the PET or Ny layer has impact resistance and gas barrier properties.

Thus, the material 12A for the outer bag 12 has excellent impact resistance and gas barrier properties as compared to the material 11A for the inner bag 11, while the material 11A for the inner bag 11 has a low moisture content, a low halogen content and a low metal ion content as compared to the material 12A for the outer bag 12.

The outer bag 12 is obtained by preparing a front-surface film, composed of the outer bag material 12A, and a back-side film, and heat-sealing the peripheries of these films to form a heat-sealed portion 12a.

In the bottom of the chemical storage bag 10, the heat-sealed portion 11a of the inner bag 11 and the heat-sealed portion 12a of the outer bag 12 are formed integrally.

As described below, the dew point in the chemical storage container 1 is reduced and controlled in the range of −50° C. to −70° C. by supplying dry air into the chemical storage container 1 to replace the internal atmosphere with the dry air.

Dry air having a humidity of 0.01% to 0.67% and a dew-point temperature of −70° C. to −40° C. can be used as dry air to be supplied into the chemical storage container 1.

In order to supply dry air into the chemical storage container 1, the lid 5 has a dry air supply opening 18 for supplying dry air into the chemical nozzle space 15A.

A connecter (dry air supply opening connecter) 18a is coupled to the dry air supply opening 18. Dry air from an external dry air supply source (not shown), connected to the connecter 18a, is supplied via the dry air supply opening 18 into the chemical nozzle space 15R. The dry air, supplied into the chemical nozzle space 15A, is then supplied into the chemical storage bag 10.

The dry air, supplied into the chemical storage bag 10, flows upward in the chemical nozzle 16 and is discharged to the outside from the connecter 16a. The connecter 18a is equipped with an on-off valve 18b.

Dry air can also be supplied from the external dry air supply source to the connecter 17a on the top of the pressurized gas supply nozzle 17. Thus, dry air from the external dry air supply source, connected to the connecter 17a, is supplied through the pressurized gas supply nozzle 17 into the pressurized gas space 15S. The dry air, supplied into the pressurized gas space 15B, is then sent through the through-holes 22a, 22b of the ejection member 15 into the pressurization space 8 between the metal can 2 and the chemical storage bag 10.

As described above, the through-holes 22a and the through-holes 22b are provided in the bottom 22 of the ejection member 15. The through-holes 22a have a relatively large opening, are located in the vicinity of the pressurized gas supply nozzle 17, and mainly function to supply dry air into the pressurization space 8 between the metal can 2 and the chemical storage bag 10. The through-holes 22b have a relatively small opening.

The lid 5 has a dry air discharge opening 19 for discharging dry air from the pressurized gas space 15B. A connecter (dry air discharge opening connecter) 19a is connected to the dry air discharge opening 19. The dry air discharge opening 19 is disposed in the vicinity of the through-holes 22b having a relatively small opening. Dry air, which has been sent from the pressurized gas space 15B through the through-holes 22a into the pressurization space 8 between the metal can 2 and the chemical storage bag 10, is returned to the pressurized gas space 15B mainly through the through-holes 22b, and discharged from the connecter 19a via the dry air discharge opening 19. The connecter 19a is equipped with an on-off valve 19b.

The operation of the chemical storage container 1 of this embodiment having the above-described construction will now be described.

A method for producing the chemical storage container 1 will be described first.

As shown in FIG. 4, the inner bag 11 is inserted from the top opening of the outer bag 12 into the outer bag 12 and placed in it.

Next, the ejection member 15 is inserted from the top opening of the inner bag 11 into the inner bag 11.

Thereafter, the top opening of the inner bag 11 is aligned with the top opening of the outer bag 12, and they are heat-sealed integrally.

A sealed portion 13, where the top opening of the inner bag 11 and the top opening of the outer bag 12 have been heat-sealed integrally, is thus formed. At the same time, the seal fixing portion 25 of the ejection member 15 is heat-sealed integrally with the inner bag 11 and the outer bag 12, whereby the ejection member 15 is fixed by the sealed portion 13 to the inner bag 11 and the outer bag 12 (see FIG. 4).

Next, the bottom of the inner bag 11 and the bottom of the outer bag 12 are heat-sealed integrally.

The chemical storage bag 10, including the inner bag 11 and the outer bag 12 and to which the ejection member 15 is mounted, is obtained in this manner.

Besides the above-describe method, the chemical storage bag 10 can be produced by any other method.

On the other hand, the lid 5 to which the chemical nozzle 16, the pressurized gas supply nozzle 17 and the connecters 16a, 17a, 18a, 19a have been mounted is prepared. The chemical nozzle 16 is inserted into the chemical nozzle space 15A formed by the partition wall 20 of the ejection member 15, the pressurized gas supply nozzle 17 is inserted into the pressurized gas space 15B, and the chemical storage bag 10, the lid 5 and the ejection member 15 are assembled together.

Next, the chemical storage bag 10 is inserted from the top opening 2a into the outer container (metal can) 2, and the ejection member 15 is fit into the top opening 2a of the metal can 2. In particular, the side 23 of the ejection member 15 is fit into the top opening 2a of the metal can 2, and the lid 5 is fastened by bolts 6 to a portion of the metal can 2, located around the top opening 2a. The pressurized gas supply nozzle 17, mounted to the lid 5, extends in the pressurized gas space 15B of the ejection member 15.

Next, the internal atmosphere of the chemical storage container 1 is replaced with dry air in the following manner.

First, the connecter 18a at the dry air supply opening 18 and the connecter 17a of the pressurized gas supply nozzle 17 are connected to an external dry air supply source (not shown). Next, dry air is supplied from the dry air supply source into the chemical nozzle space 15A via the dry air supply opening 18, and the dry air is then supplied into the chemical storage bag 10, whereby air in the chemical storage bag 10 is replaced with dry air.

The dry air in the chemical storage bag 10 is then allowed to flow through the chemical nozzle 16, and is discharged to the outside via the connecter 16a.

Similarly, dry air is supplied from the dry air supply source into the pressurized gas space 15B via the pressurized gas supply nozzle 17. The dry air in the pressurized gas space 15B is then supplied mainly through the through-holes 22a into the pressurization space 8 between the metal can 2 and the chemical storage bag 10, whereby air in the pressurization space 8 is replaced with dry air. Dry air may be supplied either simultaneously into the chemical storage bag 10 and into the pressurization space 8, or first into the chemical storage bag 10, or first into the pressurization space 8.

The dry air in the pressurization space 8 is returned to the pressurized gas space 15B mainly via the through-holes 22b, and is discharged to the outside via the dry air discharge opening 19 and the connecter 19a.

In this manner the dew point in the chemical storage bag 10 and the dew point in the pressurization space 8 between the metal can 2 and the chemical storage bag 10 can be decreased to about −50° C. to −70° C. Appropriate control of the dew points can thus be effected. Further, by adjusting the timing of the supply of dry air and the timing of the discharge of dry air, the chemical storage bag 10 can be sufficiently expanded in the metal can 2. Thus, the chemical storage bag 10 can obtain a sufficient interior volume to hold a liquid chemical 3. A dew-point meter may be installed in each of the connecter 16a and the connecter 19a so that the dew point in the chemical storage bag 10 and the dew point in the pressurization space 8 can be measured to control the dew points.

By decreasing the dew point in the chemical storage bag 10 and the dew point in the pressurization space 8, the liquid chemical 3, even if it is sensitive to humidity, can be safely stored in the chemical storage bag 10.

Thereafter, the connecter 17a is disconnected from the external dry air supply source, and the connecter 18a is disconnected from the external dry air supply source. Further, the on-oft valves 16b, 17b, 18b, 19b of the connecters 16a, 17a, 18a, 19a are closed.

When putting the liquid chemical 3 in the chemical storage bag 10, the chemical nozzle 16 is connected via the connecter 16a to an external supply mechanism (not shown), and the liquid chemical 3 is supplied from the supply mechanism into the inner bag 11. The liquid chemical 3 can be supplied to the chemical storage bag 10 by opening the on-off valve 16b of the connecter 16a. After the liquid chemical 3 has been filled into the chemical storage bag 10 to a certain extent and the pressure of gas in the chemical storage bag 10 has become high, the on-off valve 18b is opened to release the internal pressure. In this manner, the pressure in the chemical storage bag 10 can be released while preventing intrusion of air from the external space into the chemical storage bag 10. The on-off valves 16b and 18b which have been open are closed upon completion of the supply of the liquid chemical 3 to prevent intrusion of air into the chemical storage bag 10.

Next, the connecter 16a of the chemical nozzle 16 is closed by a not-shown cap, and the other connecters 17a, 18a, 19a are each also closed by a cap. Next, the chemical storage container 1, including the metal can 2 and the chemical storage bag 10 composed of the inner bag 11 and the outer bag 12, is transported to a destination. The cap is detached from the connecter 16a of the chemical nozzle 16, and the connecter 16a is connected to a discharge mechanism (not shown).

Next, the cap is detached from the connecter 17a of the pressurized gas supply nozzle 17, and the connecter 17a is connected to an $N_2$ gas supply mechanism (not shown), and $N_2$ gas is supplied from the pressurized gas supply nozzle 17 into the pressurized gas space 15B of the ejection member 15. The on-off valves 16b, 17b are open during the supply of $N_2$ gas. The $N_2$ gas in the pressurized gas space 15B is fed through the through-holes 22a of the ejection member 15 into the pressurization space 8 between the metal can 2 and the chemical storage bag 10, where the $N_2$ gas pressurizes the chemical storage bag 10 from the outside. The liquid chemical 3 in the inner bag 11 of the chemical storage bag 10 can therefore be discharged from the chemical nozzle 16 to the discharge mechanism. During the chemical discharge operation, the amount of $N_2$ gas supplied can be adjusted while monitoring the pressure of $N_2$ gas with a pressure gauge. The on-off valves 16b, 17b are closed upon completion of the discharge of the liquid chemical 3.

As described hereinabove, according to this embodiment, the internal atmosphere of the chemical storage bag 10 and the internal atmosphere of the pressurization space 8 between the metal can 2 and the chemical storage bag 10 are replaced with dry air before supplying the liquid chemical 3 into the chemical storage bag 10. This makes it possible to decrease and control a dew point in the range of −50° C. to −70° C. in the chemical storage bag 10 and in the pressurization space 8. Therefore, the liquid chemical 3, even if it is sensitive to humidity, can be safely stored in the chemical storage bag 10 and used. Furthermore, control of the dew point can be effected in a short time without performing a drying process.

The chemical storage container 1 for storing a liquid chemical comprises: the metal can 2; the chemical storage bag 10 disposed in the metal can 2 and including the inner bag 11 for storing the liquid chemical 3, and the outer bag 12 that surrounds the inner bag 11; and the ejection member 15 mounted to the chemical storage bag 10. Compared to a device in which a liquid chemical 3 is directly put in a metal can 2, the chemical storage container 1 has the advantages of no need for frequent cleaning of the metal can 2, enabling a significant reduction in the cleaning cost.

Further, the chemical storage container 1 is provided with the lid 5 which covers the ejection member 15 and closes the top opening 2a of the metal can 2. The chemical nozzle 16, which is to penetrate through the ejection member 15, and the pressurized gas supply nozzle 17 are mounted to the lid 5 in advance of assembling the chemical storage container 1. When assembling the chemical storage container 1, the chemical nozzle 16 is inserted into the ejection member 15 which has been mounted to the chemical storage bag 10 in advance.

Thereafter, the lid 5 is fixed on the top opening 2a of the metal can 2. In this manner, the chemical nozzle 16 and the pressurized gas supply nozzle 17 can be installed easily in a simple manner.

The material 11A for the inner bag 11 has a low moisture content, a low halogen content and a low ion content. This can prevent the liquid chemical 3 stored in the inner bag 11 from being deteriorated or adversely affected by the inner bag 11.

The material 12A for the outer bag 12 has excellent impact resistance and gas barrier properties. Therefore, the outer bag 12 can externally protect the inner bag 11 so that an impact on the metal can 2 will not be directly transmitted to the inner bag 11 and, in addition, can prevent intrusion of the external atmosphere into the liquid chemical 3 in the inner bag 11.

The connecter 16a, the connecter 17a, the connecter 18a and the connecter 19a are equipped with the on-off valve 16b, the on-off valve 17b, the on-off valve 18b and the on-off valve 19b, respectively. The airtightness of the interior of the chemical storage bag 10 and the airtightness of the pressurization space 8 can be increased by closing the on-off valves 16b, 17b, 18b, 19b. This makes it possible to more securely control the dew point in the chemical storage bag 10 and the dew point in the pressurization space 8.

<Variation>

Variations will now be described. The variation differs from the embodiment shown in FIGS. 1 through 5 only in the method for replacing the internal atmosphere of the chemical storage container 1 with dry air, and is otherwise the same as the above-described embodiment.

In this variation, the connecter 18a of the dry air supply opening 18 and the connecter 17a of the pressurized gas supply nozzle 17 are first connected to an external dry air supply source (not shown). Further, the on-off valves 16b, 17b, 18b, 19b are opened.

(1) Next, dry air is supplied from the dry air supply source into the pressurized gas space 15B via the pressurized gas supply nozzle 17. The on-off valves 17b, 19b have been open. The dry air in the pressurized gas space 15B is then supplied mainly through the through-holes 22a into the pressurization space 8 between the metal can 2 and the chemical storage bag 10, whereby air in the pressurization space 8 is replaced with dry air.

The air and dry air in the pressurization space 8 are returned to the pressurized gas space 15B mainly via the through-holes 22b, and are discharged to the outside via the dry air discharge opening 19 and the connecter 19a. By thus fully replacing air in the pressurization space 8 with dry air in this manner, a slight amount of moisture, adhering to the inside wall of the metal can 2 and the external surface of the outer bag 12 of the chemical storage bag 10, can be removed. The on-off valves 17b, 19b are closed when terminating the supply of dry air. Thus, when the materials of the inner bag 11 and the outer bag 12 of the chemical storage bag 10 have poor barrier properties against moisture, a slight amount of moisture, adhering to the inside wall of the metal can 2 and the external surface of the outer bag 12 of the chemical storage bag 10, can be removed. Further, control of the dew point in the chemical storage bag 10 and the dew point in the pressurization space 8 between the metal can 2 and the chemical storage bag 10 can be effected in a short time without performing a long drying process. Furthermore, when a lithium-ion battery electrolyte, for example, is stored in the chemical storage bag 10, the above step (1) in combination with the below-described step (2) can decrease and appropriately control a dew point in the range of about −50° C. to −70° C. in the chemical storage bag 10 and in the pressurization space 8 between the metal can 2 and the chemical storage bag 10.

(2) Next, dry air is supplied from the dry air supply source into the chemical nozzle space 15A via the dry air supply opening 18, and the dry air is then supplied into the chemical storage bag 10 and expands the chemical storage bag 10. The on-off valves 16b, 18b have been open. Air in the chemical storage bag 10 is replaced with the dry air supplied into the chemical storage bag 10.

The air and dry air in the chemical storage bag 10 is then allowed to flow through the chemical nozzle 16, and is discharged to the outside via the connecter 16a. The replacement with dry air can remove a slight amount of moisture adhering to the internal surface of the inner bag 11 of the chemical storage bag 10. The on-off valves 16b, 18b are closed when terminating the supply of dry air. Thus, when the materials of the inner bag 11 and the outer bag 12 of the chemical storage bag 10 have poor barrier properties against moisture, a slight amount of moisture, adhering to the internal surface of the inner bag 11 of the chemical storage bag 10, can be removed. Further, control of the dew point in the chemical storage bag 10 can be effected in a short time without performing a long drying process. Furthermore, when a lithium-ion battery electrolyte, for example, is stored in the chemical storage bag 10, the above step (2) can decrease and appropriately control a dew point in the range of about −50° C. to −70° C. in the chemical storage bag 10.

(3) Next, the above step (1) is again carried out to replace the internal atmosphere of the pressurization space 8 with dry air, thereby reducing the dew point in the pressurization space 8. During the step (3), the chemical storage bag 10 contracts in the metal can 2.

(4) Next, the above step (2) is again carried out to replace the internal atmosphere of the chemical storage bag 10 with dry air, thereby reducing the dew point in the chemical storage bag 10. The operation of step (4) can expand the chemical storage bag 10 in the metal can 2.

The steps (3) and (4) may be repeated a desired number of times. However, the sequential process preferably ends at step (2) or step (4). If the process ends at step (1) or step (3), then the chemical storage bag 10 will be in a contracted state in the metal can 2.

In this manner, the dew point in the chemical storage bag 10 and the dew point in the pressurization space 8 between the metal can 2 and the chemical storage bag 10 can be securely decreased and appropriately controlled in the range of about −50° C. to −70° C. A dew-point meter may be installed in each of the connecter 16a and the connecter 19a so that the dew point in the chemical storage bag 10 and the dew point in the pressurization space 8 can be measured to control the dew points.

By decreasing the dew point in the chemical storage bag 10 and the dew point in the pressurization space 8, the liquid chemical 3, even if it is sensitive to humidity, can be safely stored in the chemical storage bag 10.

Thereafter, the connecter 17a is disconnected from the external dry air supply source, and the connecter 18a is disconnected from the external dry air supply source. Further, the on-off valves 16b, 17b, 18b, 19b are closed.

In the above-described variation, the steps (3) and (4) are optional, and may not be performed if the internal atmospheres of the pressurization space 8 and the chemical storage bag 10 are fully replaced with dry air in the steps (1) and (2).

Another variation will now be described with reference to FIGS. 6 through 8.

Figure 6:
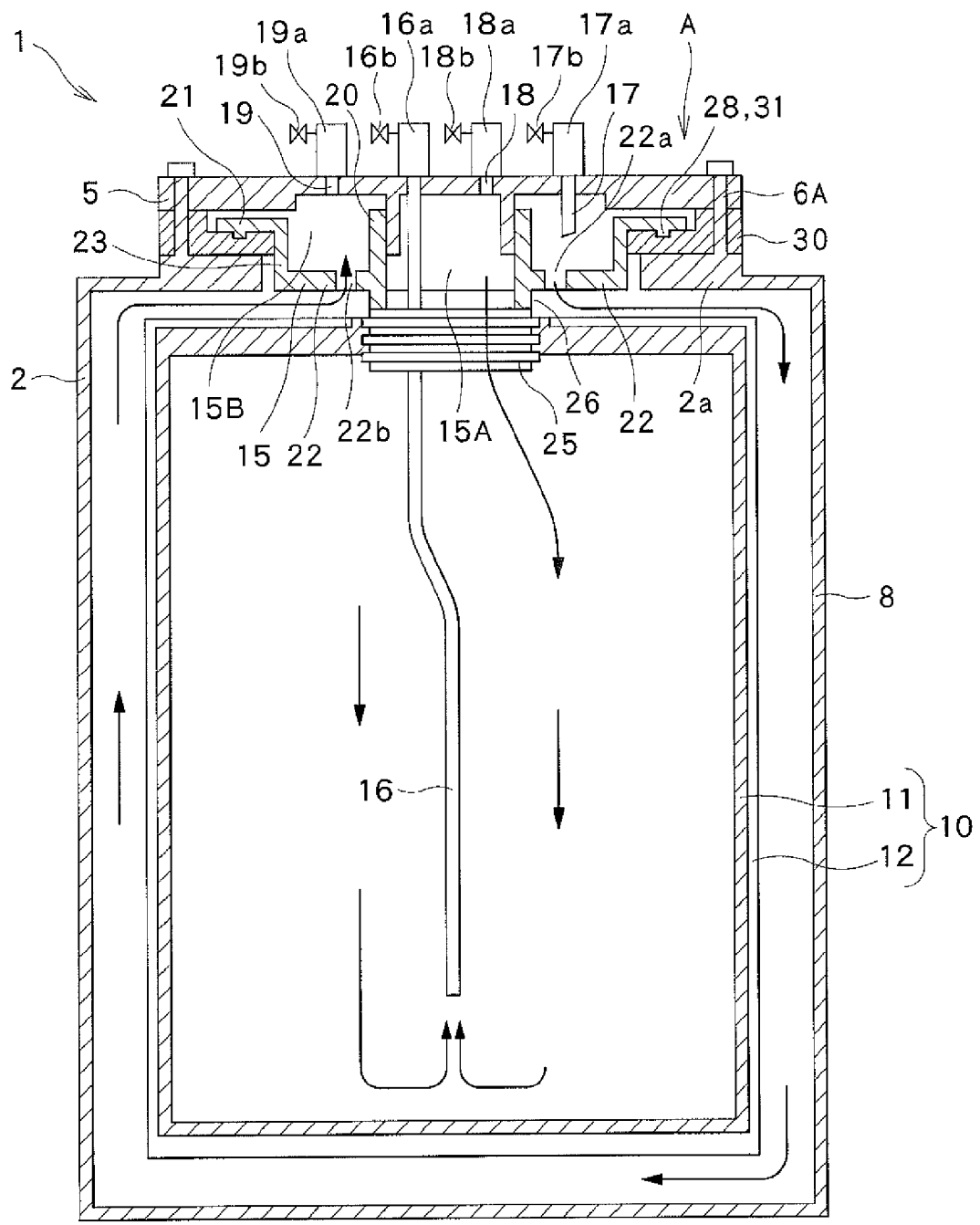
FIG. 6 is an overall schematic view of a variation of the chemical storage container according to an embodiment.
Figure 7:
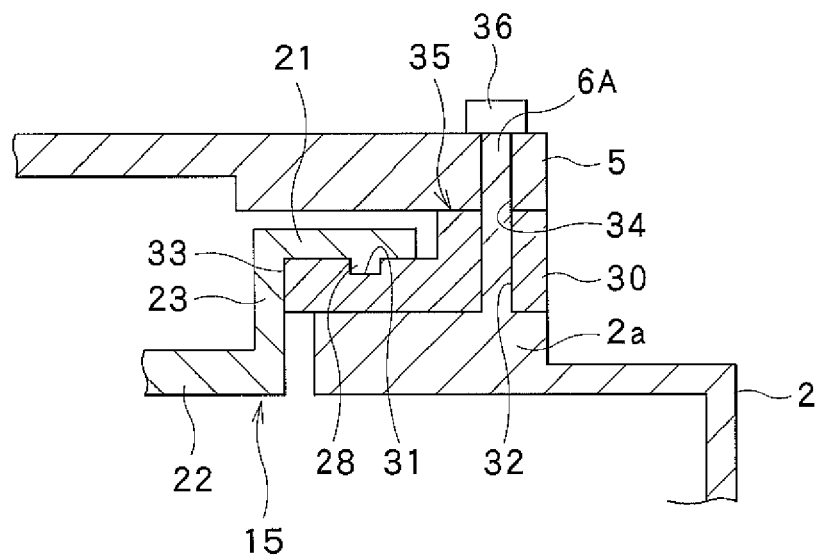
FIG. 7 is an enlarged view of the portion A of the chemical storage container of FIG. 6.
Figure 8:
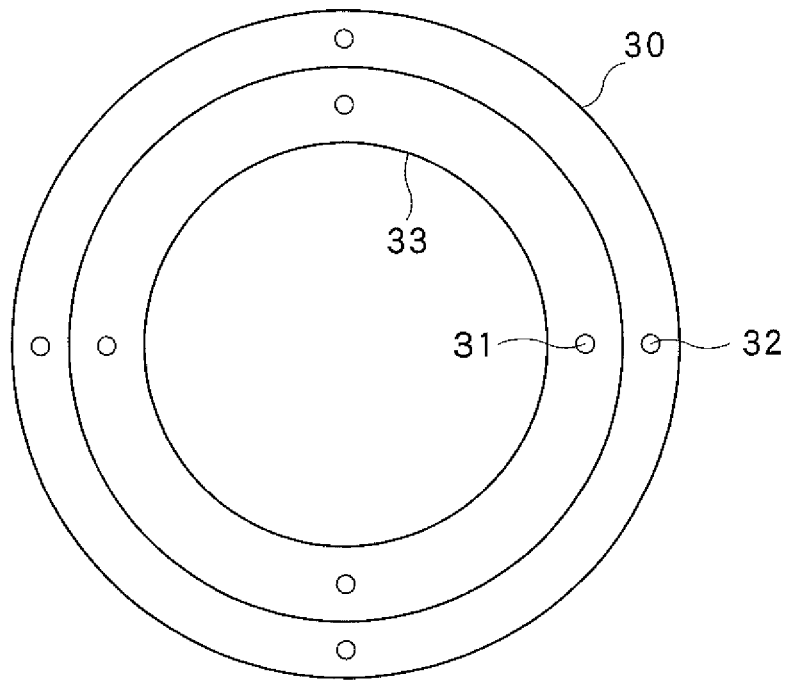
FIG. 8 is a plan view of a receiver flange.

In the variation shown in FIGS. 6 through 8, the lid 5 is fixed via a receiver flange 30 to a portion of the metal can 2, located around the top opening 2a. The other construction of the variation is approximately the same as the above-described embodiment shown in FIGS. 1 through 5.

For the variation shown in FIG. 6 through 8, the same reference numerals as used for the embodiment shown in FIGS. 1 through 5 are used to refer to the same members or components, and a detailed description thereof is omitted.

As shown in FIGS. 6 through 8, the receiver flange 30 is provided on a portion of the metal can 2, located around the top opening 2a. The receiver flange 30 enables the ejection member 15 to be securely mounted to the portion of the metal can 2, located around the top opening 2a, regardless of the shape of the ejection member 15. For example, even when the inner diameter of the top opening 2a of the metal can 2 is so large that it is difficult to position the ejection member 15 with respect to the portion of the metal can 2, located around the top opening 2a, the ejection member 15 can be securely mounted via the receiver flange 30 to the portion of the metal can 2, located around the top opening 2a by providing the receiver flange 30 having a shape that fits the shape of the ejection member 15.

The receiver flange 30 has an opening 33 into which the side 23 of the ejection member 15 fits. The receiver flange 30 has, in the upper surface, four circumferentially-arranged recesses 31 which engage four protrusions 28 provided in the peripheral flange 21 of the ejection member 15. The protrusions 28 of the ejection member 15 and the recesses 31 of the receiver flange 30 can securely perform positioning between the ejection member 15 and the receiver flange 30. Further, the protrusions 28 of the ejection member 15 and the recesses 31 of the receiver flange 30 can securely fix the chemical storage bag 10 with respect to the receiver flange 30 along the rotational direction. Therefore, when supplying dry air into the chemical storage bag 10, the chemical storage bag 10 will not rotate or twist in the metal can 2. Misuse of the chemical storage bag 10 can be prevented by determining the shape of each protrusion 28 and the shape of each recess 31 in advance.

Four upwardly-extending bolts 6A are fixed to the portion of the metal can 2, located around the top opening 2a. Each bolt 6A projects upward through a through-hole 32 of the receiver flange 30 and a through-hole 34 of the lid 5.

A nut 36 is attached to that portion of each bolt 6A which projects from the lid 5. By tightening the nuts 36 with a torque wrench, the lid 5 can be firmly fastened to the metal can 2 via the receiver flange 30.

In the variation shown in FIGS. 6 through 8, an O-ring 35 is provided on the lower surface of the lid 5 along the circumferential direction. The O-ring is in contact with the upper surface of the receiver flange 30 and increases sealing between the receiver flange 30 and the lid 5.

DESCRIPTION OF THE REFERENCE NUMERALS 1 chemical storage container
2 outer container (metal can)
2a top opening
3 liquid chemical
5 lid
6 bolt
6A bolt
8 pressurization space
10 chemical storage bag
11 inner bag
11a heat-sealed portion
11b corner
12 outer bag
12a heat-sealed portion
13 sealed portion
15 ejection member
15A chemical nozzle space
15B pressurized gas space
16 chemical nozzle
16a connecter
16b on-off valve
17 pressurized gas supply nozzle
17a connecter
17b on-off valve
18 dry air supply opening
18a connecter
18b on-off valve
19 dry air discharge opening
19a connecter
19b on-off valve
20 cylindrical partition wall
22 bottom
22a, 22b through-holes
25 seal fixing portion
26 coupling portion
28 protrusion
30 receiver flange
31 recess

The invention claimed is:

1. A chemical storage container comprising:
 (1) an outer container having a top opening;
 (2) a chemical storage bag for storing a liquid chemical, disposed in the outer container;
 (3) an ejection member provided at the upper end of the chemical storage bag; and disposed in the top opening of the outer container;
 (4) a lid configured to close the top opening of the outer container and configured to cover the ejection member;
 (5) wherein the lid has a chemical nozzle for discharging the liquid chemical configured to extend through the interior of the ejection member and a pressurized gas supply nozzle for supplying a pressurized gas into the interior of the ejection member,
 (6) wherein the interior of the ejection member is divided into a chemical nozzle space through which the chemical nozzle is configured to extend and which is configured to communicate with the interior of the chemical storage bag, and a pressurized gas space which is configured to be filled with the pressurized gas,
 (7) wherein the ejection member has a through-hole is configured to connect the pressurized gas space to a pressurization space formed between the outer container and the chemical storage bag,
 (8) wherein the lid has a dry air supply opening for supplying dry air into the chemical nozzle space, and
 (9) wherein the ejection member is provided with an ejection member partition wall for dividing the interior of the ejection member into the chemical nozzle space and the pressurized gas space, and the lid is provided with a lid partition wall for dividing the interior of the ejection member into the chemical nozzle space and the pressurized gas space, and the ejection member partition wall and the lid partition wall are in contact with each other to divide the interior of the ejection member into the chemical nozzle space and the pressurized gas space.

2. The chemical storage container according to claim 1, wherein the lid has a dry air discharge opening for discharging dry air from the pressurized gas space.

3. The chemical storage container according to claim 1, wherein the lid is fixed by fixing means to a portion of the outer container, located around the top opening.

4. The chemical storage container according to claim 2, wherein a chemical nozzle connecter, a pressurized gas supply nozzle connecter, a dry air supply opening connecter and a dry air discharge opening connecter are coupled to the chemical nozzle, the pressurized gas supply nozzle, the dry air supply opening and the dry air discharge opening, respectively, and wherein the chemical nozzle connecter, the pressurized gas supply nozzle connecter, the dry air supply opening connecter and the dry air discharge opening connecter are each equipped with an on-off valve.

5. The chemical storage container according to claim 1, further comprising a receiver flange located around the periphery of the top opening, wherein the ejection member has a peripheral flange and the peripheral flange is configured to be mounted to the receiver flange.

6. The chemical storage container according to claim 5, wherein the receiver flange has a shape that fits the shape of the ejection member.

7. The chemical storage container according to claim 5, wherein the receiver flange has a recess in the upper surface and the peripheral flange has a protrusion that fits the recess of the receiver flange.

8. The chemical storage container according to claim 1, wherein the lid partition wall is in contact with an inner surface of the ejection member partition wall.

9. A method for replacing the internal atmosphere of a chemical storage container with dry air, comprising the steps of:
 preparing a chemical storage container comprising: an outer container having a top opening; and a chemical storage bag for storing a liquid chemical, disposed in the outer container and having an ejection member provided at the upper end of the chemical storage bag, wherein the ejection member is disposed in the top opening of the outer container, wherein a lid which closes the top opening of the outer container is provided such that it covers the ejection member, wherein the lid is provided with a chemical nozzle for discharging the liquid chemical and which extends through the interior of the ejection member, and a pressurized gas supply nozzle for supplying a pressurized gas into the interior of the ejection member, wherein the interior of the ejection member is divided into a chemical nozzle space through which the chemical nozzle extends and which communicates with the interior of the chemical storage bag, and a pressurized gas space which is to be filled with the pressurized gas, wherein the ejection member has a through-hole which connects the pressurized gas space to a pressurization space formed between the outer container and the chemical storage bag, wherein the lid has a dry air supply opening for supplying dry air into the chemical nozzle space, and wherein the ejection member is provided with an ejection member partition wall for dividing the interior of the ejection member into the chemical nozzle space and the pressurized gas space, and the lid is provided with a lid partition wall for dividing the interior of the ejection member into the chemical nozzle space and the pressurized gas space, and the ejection member partition wall and the lid partition wall are in contact with each other to divide the interior of the ejection member into the chemical nozzle space and the pressurized gas space;
    supplying dry air into the chemical storage bag from the dry air supply opening of the chemical storage container; and
    discharging the dry air in the chemical storage bag to the outside via the chemical nozzle.

10. The method according to claim 9, further comprising the steps of:
    supplying dry air from the pressurized gas supply nozzle of the chemical storage container into the pressurization space between the outer container and the chemical storage bag; and
    discharging the dry air in the pressurization space to the outside via the pressurized gas space and the dry air discharge opening provided in the lid.

11. The method according to claim 9, wherein the dew point in the chemical storage bag is decreased and controlled in the range of −50° C. to −70° C. by supplying dry air into the chemical storage bag and by discharging the dry air in the chemical storage bag to the outside.

12. The method according to claim 10, wherein the dew point in the chemical storage bag is decreased and controlled in the range of −50° C. to −70° C. by supplying dry air into the chemical storage bag and by and discharging the dry air in the chemical storage bag to the outside, and wherein the dew point in the pressurization space is decreased and controlled in the range of −50° C. to −70° C. by supplying dry air into the pressurization space and by discharging the dry air in the pressurization space to the outside.

\* \* \* \* \*